US011190266B1

(12) United States Patent
Black et al.

(10) Patent No.: US 11,190,266 B1
(45) Date of Patent: Nov. 30, 2021

(54) RF SIGNAL REPEATER DEVICE MANAGEMENT FOR 5G WIRELESS NETWORKS

(71) Applicant: Pivotal Commware, Inc., Kirkland, WA (US)

(72) Inventors: Eric James Black, Bothell, WA (US); Mersad Cavcic, Kirkland, WA (US); Brian Mark Deutsch, Issaquah, WA (US); Alexander Remley Katko, Seattle, WA (US); Juan Pablo Olivo González, Bothell, WA (US); Christophe Jean Marcel Vidal, Bellevue, WA (US)

(73) Assignee: Pivotal Commware, Inc., Kirkland, WA (US)

( * ) Notice: Subject to any disclaimer, the term of this patent is extended or adjusted under 35 U.S.C. 154(b) by 0 days.

(21) Appl. No.: 17/332,136

(22) Filed: May 27, 2021

Related U.S. Application Data

(60) Provisional application No. 63/030,740, filed on May 27, 2020.

(51) Int. Cl.
*H04B 7/14* (2006.01)
*H04B 7/15* (2006.01)
(Continued)

(52) U.S. Cl.
CPC ....... *H04B 7/15542* (2013.01); *H04B 7/0617* (2013.01); *H04B 7/15592* (2013.01);
(Continued)

(58) Field of Classification Search
CPC .............. H04B 7/15542; H04B 7/0617; H04B 7/15592; H04W 12/069; H04W 16/26; H04W 24/02
See application file for complete search history.

(56) References Cited

U.S. PATENT DOCUMENTS 2,131,108 A   9/1938  Lindenblad
6,133,880 A  10/2000  Grangeat et al.
(Continued)

FOREIGN PATENT DOCUMENTS

CN   106797074 A   5/2017
JP      61-1102 A   1/1986
(Continued)

OTHER PUBLICATIONS

Office Communication for U.S. Appl. No. 15/925,612 dated Jun. 15, 2018, pp. 1-9.
(Continued)

*Primary Examiner* — Erika A Washington
(74) *Attorney, Agent, or Firm* — John W. Branch; Branch Partners PLLC

(57) ABSTRACT

A method for performing monitoring, commissioning, upgrading, analyzing, load balancing, remediating, and optimizing the operation, control, and maintenance of a plurality of remotely located RF signal repeater devices in a wireless network arranged to operate as an Internet of Things (IoT) network. Electronic RF signal repeater devices are employed as elements in the wireless network and communicate wireless radio frequency (RF) signals for a plurality of users. An RF signal repeater device may be arranged to operate as a donor unit device that provides RF signal communication between one or more remotely located wireless base stations, or other donor unit devices on the wireless network. Also, an RF signal repeater device may be arranged to operate as a service unit device that provides wireless RF signal communication between one or more user equipment devices (UEs) and a donor unit device or a wireless base station.

20 Claims, 9 Drawing Sheets

(51) Int. Cl.
  *H04B 7/155*   (2006.01)
  *H04W 12/069*  (2021.01)
  *H04W 16/26*   (2009.01)
  *H04B 7/06*    (2006.01)
  *H04W 24/02*   (2009.01)

(52) U.S. Cl.
  CPC ......... *H04W 12/069* (2021.01); *H04W 16/26* (2013.01); *H04W 24/02* (2013.01)

(56) References Cited

U.S. PATENT DOCUMENTS

| | | | |
|---|---|---|---|
| 6,150,987 | A | 11/2000 | Sole et al. |
| 7,084,815 | B2 | 8/2006 | Phillips et al. |
| 7,205,949 | B2 | 4/2007 | Turner |
| 9,356,356 | B2 | 5/2016 | Chang et al. |
| 9,385,435 | B2 | 7/2016 | Bily et al. |
| 9,450,310 | B2 | 9/2016 | Bily et al. |
| 9,551,785 | B1 | 1/2017 | Geer |
| 9,635,456 | B2 | 4/2017 | Fenichel |
| 9,711,852 | B2 | 7/2017 | Chen et al. |
| 9,806,414 | B2 | 10/2017 | Chen et al. |
| 9,806,415 | B2 | 10/2017 | Chen et al. |
| 9,806,416 | B2 | 10/2017 | Chen et al. |
| 9,812,779 | B2 | 11/2017 | Chen et al. |
| 9,955,301 | B2 | 4/2018 | Markhovsky et al. |
| 10,033,109 | B1 | 7/2018 | Gummalla et al. |
| 10,225,760 | B1 | 3/2019 | Black |
| 10,313,894 | B1 | 6/2019 | Desclos et al. |
| 10,431,899 | B2 | 10/2019 | Bily et al. |
| 10,468,767 | B1 | 11/2019 | McCandless et al. |
| 10,734,736 | B1 | 8/2020 | McCandless et al. |
| 2002/0196185 | A1 | 12/2002 | Bloy |
| 2003/0025638 | A1 | 2/2003 | Apostolos |
| 2004/0029651 | A1 | 2/2004 | Jordan et al. |
| 2004/0038714 | A1 | 2/2004 | Rhodes et al. |
| 2005/0237265 | A1 | 10/2005 | Durham et al. |
| 2006/0025072 | A1 | 2/2006 | Pan |
| 2007/0024514 | A1 | 2/2007 | Phillips et al. |
| 2007/0147338 | A1* | 6/2007 | Chandra ............... H04W 8/245 370/350 |
| 2007/0202931 | A1 | 8/2007 | Lee et al. |
| 2008/0039012 | A1 | 2/2008 | McKay et al. |
| 2008/0181328 | A1 | 7/2008 | Harel et al. |
| 2009/0176487 | A1* | 7/2009 | DeMarco ............. H04B 7/2606 455/422.1 |
| 2009/0207091 | A1 | 8/2009 | Anagnostou et al. |
| 2009/0296938 | A1* | 12/2009 | Devanand ............. H04L 9/0631 380/278 |
| 2010/0197222 | A1 | 8/2010 | Scheucher |
| 2010/0248659 | A1 | 9/2010 | Kawabata |
| 2010/0302112 | A1 | 12/2010 | Lindenmeier et al. |
| 2011/0070824 | A1 | 3/2011 | Braithwaite |
| 2011/0199279 | A1 | 8/2011 | Shen et al. |
| 2012/0194399 | A1 | 8/2012 | Bily et al. |
| 2013/0069834 | A1 | 3/2013 | Duerksen |
| 2013/0231066 | A1 | 9/2013 | Zander et al. |
| 2013/0303145 | A1 | 11/2013 | Harrang et al. |
| 2013/0324076 | A1 | 12/2013 | Harrang |
| 2014/0094217 | A1 | 4/2014 | Stafford |
| 2014/0171811 | A1 | 6/2014 | Lin et al. |
| 2014/0198684 | A1 | 7/2014 | Gravely et al. |
| 2014/0266946 | A1 | 9/2014 | Bily et al. |
| 2014/0269417 | A1* | 9/2014 | Yu ....................... H04L 41/0803 370/254 |
| 2014/0293904 | A1 | 10/2014 | Dai et al. |
| 2014/0308962 | A1 | 10/2014 | Zhang et al. |
| 2014/0349696 | A1 | 11/2014 | Hyde et al. |
| 2015/0109178 | A1 | 4/2015 | Hyde et al. |
| 2015/0109181 | A1 | 4/2015 | Hyde et al. |
| 2015/0116153 | A1 | 4/2015 | Chen et al. |
| 2015/0162658 | A1 | 6/2015 | Bowers et al. |
| 2015/0222021 | A1 | 8/2015 | Stevenson et al. |
| 2015/0229028 | A1 | 8/2015 | Bily et al. |
| 2015/0276926 | A1 | 10/2015 | Bowers et al. |
| 2015/0276928 | A1 | 10/2015 | Bowers et al. |
| 2015/0288063 | A1 | 10/2015 | Johnson et al. |
| 2015/0318618 | A1 | 11/2015 | Chen et al. |
| 2015/0372389 | A1 | 12/2015 | Chen et al. |
| 2016/0037508 | A1 | 2/2016 | Sun |
| 2016/0079672 | A1 | 3/2016 | Cerreno |
| 2016/0087334 | A1 | 3/2016 | Sayama et al. |
| 2016/0149308 | A1 | 5/2016 | Chen et al. |
| 2016/0149309 | A1 | 5/2016 | Chen et al. |
| 2016/0149310 | A1 | 5/2016 | Chen et al. |
| 2016/0164175 | A1 | 6/2016 | Chen et al. |
| 2016/0174241 | A1 | 6/2016 | Ansari et al. |
| 2016/0219539 | A1 | 7/2016 | Kim et al. |
| 2016/0241367 | A1 | 8/2016 | Irmer et al. |
| 2016/0269964 | A1 | 9/2016 | Murray |
| 2016/0345221 | A1 | 11/2016 | Axmon et al. |
| 2016/0373181 | A1 | 12/2016 | Black et al. |
| 2017/0118750 | A1 | 4/2017 | Kikuma et al. |
| 2017/0127295 | A1 | 5/2017 | Black et al. |
| 2017/0127296 | A1 | 5/2017 | Gustafsson et al. |
| 2017/0127332 | A1 | 5/2017 | Axmon et al. |
| 2017/0155192 | A1 | 6/2017 | Black et al. |
| 2017/0155193 | A1 | 6/2017 | Black et al. |
| 2017/0187123 | A1 | 6/2017 | Black et al. |
| 2017/0187426 | A1 | 6/2017 | Su et al. |
| 2017/0194704 | A1 | 7/2017 | Chawgo et al. |
| 2017/0238141 | A1 | 8/2017 | Lindoff et al. |
| 2017/0339575 | A1 | 11/2017 | Kim et al. |
| 2017/0367053 | A1 | 12/2017 | Noh et al. |
| 2017/0373403 | A1 | 12/2017 | Watson |
| 2018/0027555 | A1 | 1/2018 | Kim et al. |
| 2018/0066991 | A1 | 3/2018 | Mueller et al. |
| 2018/0097286 | A1 | 4/2018 | Black et al. |
| 2018/0219283 | A1 | 8/2018 | Wilkins et al. |
| 2018/0227035 | A1 | 8/2018 | Cheng et al. |
| 2018/0227445 | A1 | 8/2018 | Minegishi |
| 2018/0233821 | A1 | 8/2018 | Pham et al. |
| 2018/0270729 | A1 | 9/2018 | Ramachandra et al. |
| 2018/0301821 | A1 | 10/2018 | Black et al. |
| 2018/0337445 | A1 | 11/2018 | Sullivan et al. |
| 2018/0368389 | A1 | 12/2018 | Adams |
| 2019/0020107 | A1 | 1/2019 | Polehn et al. |
| 2019/0052428 | A1 | 2/2019 | Chu et al. |
| 2019/0053013 | A1 | 2/2019 | Markhovsky et al. |
| 2019/0067813 | A1 | 2/2019 | Igura |
| 2019/0221931 | A1 | 7/2019 | Black et al. |
| 2019/0289482 | A1 | 9/2019 | Black |
| 2020/0186227 | A1 | 6/2020 | Reider et al. |
| 2020/0205012 | A1 | 6/2020 | Bengtsson et al. |

FOREIGN PATENT DOCUMENTS

| | | |
|---|---|---|
| JP | 936656 A | 2/1997 |
| JP | 2007081648 A | 3/2007 |
| JP | 2007306273 A | 11/2007 |
| JP | 2012-175189 A | 9/2012 |
| JP | 2014207626 A | 10/2014 |
| JP | 2017-220825 A | 12/2017 |
| KR | 10 2016 0113100 A | 9/2016 |
| WO | 2012050614 A1 | 4/2012 |
| WO | 2012161612 A1 | 11/2012 |
| WO | 2015196044 A1 | 12/2015 |
| WO | 2017014842 A1 | 1/2017 |
| WO | 2017193056 A1 | 11/2017 |
| WO | 2018179870 A1 | 10/2018 |

OTHER PUBLICATIONS

U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2018, pp. 1-12.
Office Communication for U.S. Appl. No. 16/136,119 dated Mar. 15, 2019, pp. 1-8.

(56) References Cited

OTHER PUBLICATIONS

Office Communication for U.S. Appl. No. 16/292,022 dated Jun. 7, 2019, pp. 1-13.
Office Communication for U.S. Appl. No. 16/049,630 dated Apr. 12, 2019, pp. 1-13.
Office Communication for U.S. Appl. No. 16/268,469 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated May 15, 2019, pp. 1-17.
International Search Report and Written Opinion for International Application No. PCT/US2019/022942 dated Jul. 4, 2019, pp. 1-12.
Yurduseven, Okan et al., "Dual-Polarization Printed Holographic Multibeam Metasurface Antenna" Aug. 7, 2017, IEEE Antennas and Wireless Propagation Letters. PP. 10.1109/LAWP.2017, pp. 1-4.
International Search Report and Written Opinion for International Application No. PCT/US2019/022987 dated Jul. 2, 2019, pp. 1-13.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/440,815 dated Oct. 7, 2019, pp. 1-5.
Office Communication for U.S. Appl. No. 16/268,469 dated Sep. 10, 2019, pp. 1-11.
International Search Report and Written Opinion for International Application No. PCT/US2019/041053 dated Aug. 27, 2019, pp. 1-8.
Office Communication for U.S. Appl. No. 16/568,096 dated Oct. 24, 2019, pp. 1-10.
International Search Report and Written Opinion for International Application No. PCT/US2019/047093 dated Oct. 21, 2019, pp. 1-7.
Office Communication for U.S. Appl. No. 16/049,630 dated Dec. 9, 2019, pp. 1-13.
Office Communication for U.S. Appl. No. 16/440,815 dated Jan. 8, 2020, pp. 1-8.
Office Communication for U.S. Appl. No. 16/730,932 dated Mar. 6, 2020, pp. 1-13.
Office Communication for U.S. Appl. No. 16/049,630 dated Mar. 31, 2020, pp. 1-15.
Office Communication for U.S. Appl. No. 16/734,195 dated Mar. 20, 2020, pp. 1-8.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for Application No. PCT/US2020/016641 dated Apr. 14, 2020, pp. 1-7.
Gao, S.S. et al., "Holographic Artificial Impedance Surface Antenna Based on Circular Patch", 2018 International Conference on Microwave and Millimeter Wave Technology (ICMMT), 2018, pp. 1-3.
Nishiyama, Eisuke et al., "Polarization Controllable Microstrip Antenna using Beam Lead PIN Diodes", 2006 Asia-Pacific Microwave Conference, 2006, pp. 1-4.
International Search Report and Written Opinion for Application No. PCT/US2020/013713 dated Apr. 21, 2020, pp. 1-8.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/983,978 dated Sep. 16, 2020, pp. 1-7.
Office Communication for U.S. Appl. No. 16/049,630 dated Oct. 15, 2020, pp. 1-16.
Office Communication for U.S. Appl. No. 16/983,978 dated Oct. 27, 2020, pp. 1-13.
International Search Report and Written Opinion for Application No. PCT/US2020/048806 dated Nov. 17, 2020, pp. 1-9.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.
Office Communication for U.S. Appl. No. 16/983,927 dated Jan. 6, 2021, pp. 1-8.
Office Communication for U.S. Appl. No. 16/846,670 dated Feb. 8, 2021, pp. 1-4.
Office Communication for U.S. Appl. No. 16/983,978 dated Feb. 10, 2021, pp. 1-11.
Office Communication for U.S. Appl. No. 16/846,670 dated Apr. 2, 2021, pp. 1-9.
Office Communication for U.S. Appl. No. 16/730,690 dated Apr. 8, 2021, pp. 1-11.
Office Communication for U.S. Appl. No. 17/177,131 dated Apr. 9, 2021, pp. 1-17.
Vu, Trung Kien et al., "Joint Load Balancing and Interference Mitigation in 5G Heterogeneous Networks," IEEE Transactions on Wireless Communications, 2017, vol. 16, No. 9, pp. 6032-6046.
Office Communication for U.S. Appl. No. 17/177,145 dated Apr. 19, 2021, pp. 1-11.
Office Communication for U.S. Appl. No. 17/112,940 dated Jul. 21, 2021, pp. 1-22.
International Search Report and Written Opinion for International Patent Application No. PCT/US2021/026400 dated Jul. 20, 2021, pp. 1-7.
Office Communication for U.S. Appl. No. 17/177,145 dated Aug. 3, 2021, pp. 1-16.
Office Communication for U.S. Appl. No. 17/177,131 dated Aug. 6, 2021, pp. 1-16.

\* cited by examiner

RF SIGNAL REPEATER DEVICE MANAGEMENT FOR 5G WIRELESS NETWORKS

CROSS-REFERENCE TO RELATED APPLICATION

This application is a Utility Patent application based on previously filed U.S. Provisional Patent Application No. 63/030,740 filed on May 27, 2020, the benefit of the filing date of which is hereby claimed under 35 U.S.C. § 119(e) and which is further incorporated in entirety by reference.

TECHNICAL FIELD

The invention relates generally to employing directional antennas placed on structures, such as poles, or buildings, that provide a wireless network for communicating RF signals between user devices and remotely located resources. Further, in some embodiments, the directional antennas may be coupled to base stations and RF signal repeater devices to manage operation of the wireless network.

BACKGROUND

Mobile devices have become the primary mode of wireless communication for most people throughout the world. In the first few generations of wireless communication networks, mobile devices were generally used for voice communication, text messages, and somewhat limited internet access. Newer generations of wireless communication networks have increased bandwidth and lowered latency enough to provide substantially more services to mobile device users, such as purchasing products, paying invoices, streaming movies, playing video games, online learning, dating, and more. Also, for each new generation of wireless communication network, the frequency and strength of the wireless signals are generally increased to provide even more bandwidth with less latency.

Unfortunately, the higher a frequency of a wireless signal, the greater the attenuation of wireless signals passing through physical barriers and over shorter distances than lower frequency wireless signals. Moreover, since the recent rollout of $5^{th}$ generation (5G) wireless communication networks that can use wireless signals with millimeter waveforms at gigahertz frequencies, it has become even more difficult to provide access to these 5G wireless networks for mobile devices due to these physical barriers.

DESCRIPTION OF VARIOUS EMBODIMENTS OF THE INVENTION

Figure 1A:
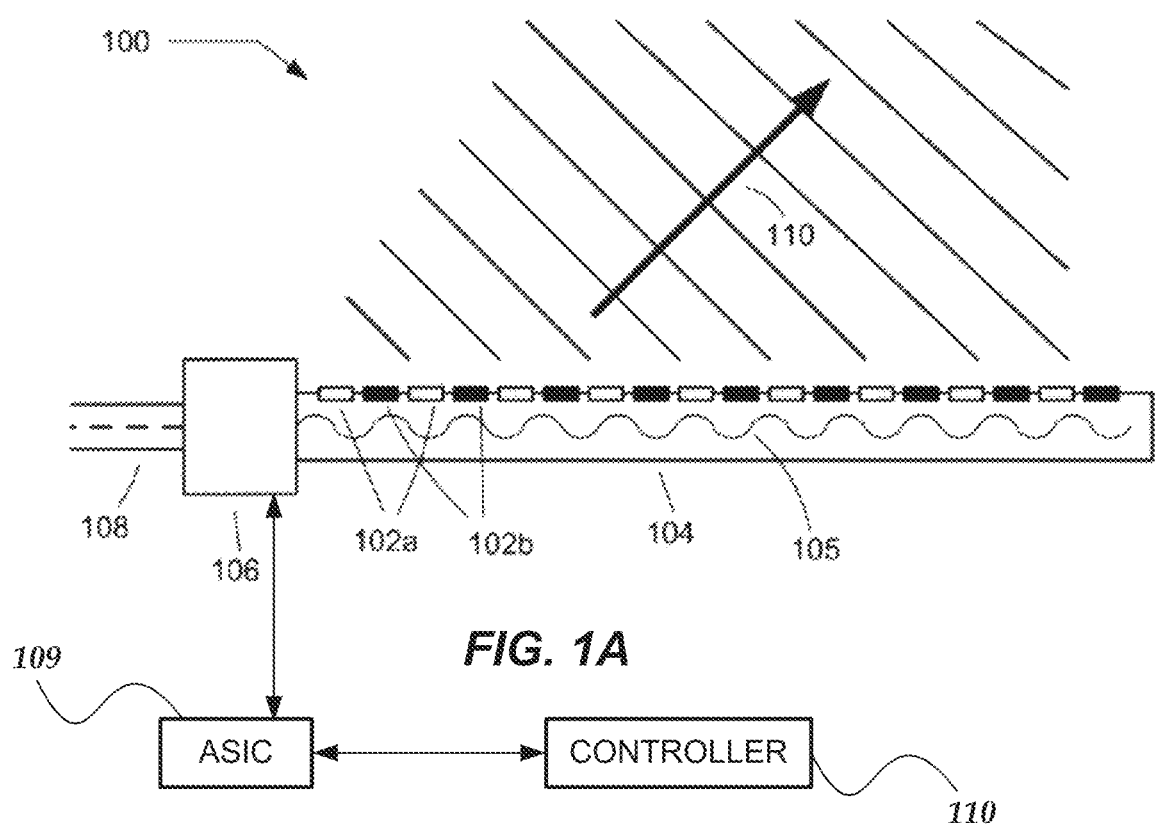
FIG. 1A shown an embodiment of an exemplary surface scattering antenna with multiple varactor elements arranged to propagate electromagnetic waves in such a way as to form an exemplary instance of holographic metasurface antennas (HMA)

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense. As used herein, "base station" refers to a type of wireless communication device, or a network computing device, that facilitates wireless communication between a wireless network and a plurality of different types of wireless computing devices employed by users, which can also be referred to as user equipment (UE). A wireless base station uses information provided by a link to remote computing resources to generate an RF signal (downlink) that is communicated to other wireless computing devices. Also, the wireless base station is arranged to receive an RF signal (uplink) that includes information from other wireless devices. The uplink information is extracted from the RF signal and forwarded by another link to remote computing resources. In one or more embodiments, these links may employ optical fiber and/or microwave signals to communicate information between the wireless base station and the remote computing resources, such as a Network Operations Center (NOC).

Additionally, in one or more embodiments, the wireless network can employ any type of wireless communication protocol or wired/wireless technologies. Also, as used herein, gNodeB", or "gNb" refers to a particular type of base station that facilitates wireless communication between a $5^{th}$ generation (5G) or higher wireless network that utilizes New Radio (NR) technology and a plurality of different types of wireless computing devices employed by users. A 5G wireless network may be deployed with two frequency ranges for the wireless signals. The first frequency range may be a Sub-6 GigaHertz wave band and the second frequency range may be millimeter wave bands (mmWave), i.e., 24.25 GigaHertz to 52.6 GigaHertz. The mmWave bands can communicate wireless signals at a higher bandwidth but have a short range than wireless signals communicated at the Sub-6 GigaHertz wave band at a lower bandwidth.

As used herein, "Internet of Things", "IoT" or "IOT" refers to an architecture for one or more types of networked elements, such as components, applications, systems, or devices. In one or more embodiments, IoT elements are networked together to provide wireless and/or wired communication and other services between an element management system (EMS) and a plurality of remotely located RF signal repeater devices arranged as donor unit devices and/or server unit devices in one or more $5^{th}$ generation (5G) or greater generation wireless networks. Further, the IoT elements may also be employed to monitor, store, collect, pre-process, and analyze various types of data and information from the remotely located RF signal repeater devices. Also, the IoT network enables the EMS to employ a beam management application (BMA) to monitor and control the operation of the plurality of RF signal repeater devices.

As used herein, an element management system (EMS) refers to a platform or application that manages communication provided by one or more types of telecommunication elements in a network. Typically, the EMS manages the functions and capabilities of each element but does not manage the network traffic between different elements in a network. To support management of the network traffic between the EMS and other elements, the EMS communicates upward to a higher-level network management system (NMS). In one or more embodiments, the network for the EMS and the other elements is arranged as an Internet of Things (IoT) network to provide at least a portion of the NMS functionality and interoperability between each element in the IoT network.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments of the invention are directed to a method, apparatus, or system that employs a beam management application (BMA) that performs a plurality of actions, including monitoring, commissioning, upgrading, analyzing, load balancing, remediating, and optimizing the operation, control, and maintenance of a plurality of remotely located RF signal repeater devices. The RF signal repeater devices are arranged to operate as donor unit devices and/or service unit devices that route communication of wireless signals between one or more wireless base stations and one or more other donor unit devices, other service unit devices, customer premises equipment (CPE), and user equipment (UEs) over one or more wireless networks. Further, the BMA enables users, such as administrative users, installation technicians, and other network stakeholders to remotely control and operate a plurality of remotely located RF signal repeater devices that route communication between a wireless base station and a plurality of UEs on one or more wireless networks. Further, the donor unit devices may be arranged to provide wireless communication between a wireless base station and one or more other donor unit devices or service unit devices. Also, the service unit devices may be arranged to provide wireless communication between one or more donor unit devices or wireless base stations and one or more CPEs or UEs.

In one or more embodiments, the RF wireless signals may be represented by millimeter waveforms (mmWave) at gigahertz frequencies via $5^{th}$ Generation (5G) communication protocols, such as 5g New Radio (5G NR) that are communicated over the wireless network between various nodes, e.g., gNbs, donor unit devices, service unit devices, CPEs, UEs, and other wireless computing devices. In one or more embodiments, the RF wireless signals having millimeter waveforms may be arranged as a beam waveform that is radiated in a direction at an azimuth and elevation of a physical location of a node in the wireless network. Also, in one or more embodiments the RF signal repeater devices communicate the millimeter waveforms of the 5G wireless signals in a selected beam waveform radiated by one or more beam forming antennas that includes a selectable shape, direction, strength, and/or phase for the beam waveform directed towards a determined location of another RF signal repeater device and/or an identified UE during a scheduled time period that may be allocated in a pointing schedule.

Also, in one or more embodiments, one or more portions of the RF wireless signals may be communicated with lesser frequencies non-millimeter waveforms via $4^{th}$ Generation (4G) communication protocols, such as Long Term Evolution (LTE), and the like. Further, RF wireless signals that provide control for one or more RF repeater devices may be communicated via 4G, or less, communication protocols to reduce attenuation of these control signals passing through physical barriers, lower energy consumption, and/or save costs.

For example, in one or more embodiments, a service unit device may employ a first antenna to communicate RF signals via 5G protocols with one or more donor unit devices or remote base stations. Also, the service unit device may then repeat these RF signals with a second antenna via 5G protocols and/or a third antenna via 4G protocols to various other nodes, e.g., CPEs, UEs or other wireless computing devices.

Additionally, in one or more embodiments, a service unit device may employ a first antenna arranged to communicate RF signals in beam waveforms via 5G or higher generation protocols with one or more donor unit devices or remote wireless base stations. Also, the service unit device may employ a second antenna arranged to repeat these RF signals arranged in non-beam waveforms via 5G, 4G or lesser generation protocols to various other nodes, e.g., CPEs, UEs or other wireless computing devices.

In one or more embodiments, the CPE may be any terminal device and/or associated communication equipment located at a customer's location and/or premises and can provide communication over one or more telecommunication channels provided by a telecommunication carrier. The CPE is typically established at a location in a structure separate from other communication equipment provided by a carrier or some other communication service provider. The CPE may include one or more IP telephones, mobile phones, routers, network switches, residential gateways, set top television boxes, home network adapters, or the like.

Also, in one or more embodiments, the RF signal repeater devices may employ one or more beam forming antennas, which may include one or more holographic metasurface antennas (HMAs), or any other type of holographic beam forming antennas (HBFs). An HMA may use an arrangement of controllable elements to produce an object wave. Also, in one or more embodiments, the controllable elements may employ individual electronic circuits that have two or more different states. In this way, an object wave can be modified by changing the states of the electronic circuits for one or more of the controllable elements. A control function, such as a hologram function, can be employed to define a current state of the individual controllable elements for a particular object wave. In one or more embodiments, the hologram function can be predetermined or dynamically created in real time in response to various inputs and/or conditions. In one or more embodiments, a library of predetermined hologram functions may be provided. In the one or more embodiments, any type of HBF can be used that is arranged to produce the beam waveforms described herein.

In one or more embodiments, an RF signal repeater device may include one or more of an HBF antenna, a parabolic antenna, a spherical antenna, a helical antenna, a yagi antenna, a horn antenna, or a phased array antenna. Also, in one or more embodiments, the frequencies of the uplink and/or downlink wireless signals may vary widely, e.g., as low as 600 Mega Hertz or as high as 72 Giga Hertz.

In one or more embodiments, an RF signal repeater device may identify and decode a protocol for wireless control signals included in monitored wireless signals that are used to separately identify each UE and corresponding location along with an allocation schedule that includes allocated transmit/receive time periods in the allocation schedule for each identified UE to communicate wireless signals between a wireless base station and each identified UE.

In one or more embodiments, one or more networks of Internet of Things (IoT) elements may be employed to provide distributed and scalable communication for the BMA to control and monitor one or more remotely located RF signal repeater devices, such as donor unit devices and/or service unit devices, in one or more 5G or greater generation wireless communication networks. For example, the types of control for the plurality of RF signal repeater devices may include one or more of raster scan, azimuth, elevation, gain, waveform, commission, upgrade, updates, and diagnostics. Also, the types of monitoring may include measurement of load, bandwidth, throughput, latency, jitter, error rate, data rate, energy efficiency, and quality of service.

In one or more embodiments, one or more IoT network may employ one or more protocols to communicate with the RF signal repeater devices, e.g., the Message Queuing Telemetry Transport (MQTT) protocol. Further, in one or more embodiments, a separate Certificate Authority may be provided to validate one or more cryptographic certificates provided by the RF signal repeater devices in a request for registration to the BMA. Once the RF signal repeater device's cryptographic certificate is validated, the BMA registers the RF signal repeater device and begins monitoring and controlling the operation of the registered RF signal repeater device. Also, in one or more embodiments, one or more types of public key cryptographic certificates may be employed to validate and register RF signal repeater devices, such as those that conform to the X.509 standard that are used in one or more of the Transport Layer Security (TLS), Socket Security Layer (SSL), HyperText Transport Protocol Security (HTTPS) protocols, or the like.

In one or more embodiments, a user may login to the BMA with a secure remotely managed user and password schema. Further, each user may be assigned one or more different roles, which may provide access for each role to different scopes of functionality and information. Also, once a user's login is authenticated, Java Script Object Notation (JSON) web tokens (JWT) are assigned. In this way, subsequent API command calls for a period of time, e.g., 24 hours, may be executed on behalf of the user based on validation of the JWT by a remote security authority.

In one or more embodiments, the remotely located RF signal repeater devices may be arranged as elements included in a new, extended, or existing IoT network. Further, the IoT network may employ an IoT gateway and/or hub to employ machine learning to provision a virtualized digital twin element in a remote computing environment for each RF signal repeater device. Also, the digital element twin may be employed to model mirrored characteristics, parameters, firmware versions, and key performance indicator values of the actual RF signal repeater device so that various changes to these characteristics, parameters, firmware versions and the effect of these changes, if any, on key performance indicator (KPI) values may be first simulated by the digital twin element before modifying control or operation of the actual RF signal repeater device. Additionally, one or more updates, such as software, firmware, or the like, may first be provisioned at the digital twin element for modeling, simulation and testing. Once the modeled simulation and test results are approved for the digital twin element, the one or more updates may be provisioned on the actual corresponding RF signal repeater device.

In one or more embodiments, key performance indicators (KPIs) for the wireless network and/or RF signal repeater device are selectable by the user and may include one or more of system up time, RF power level, device temperature, polarization downlink over time, polarization uplink over time, quality of service or the like.

In one or more embodiments, the BMA provides for automation of dynamic and real time remediation and optimization of one or more determined values associated with network traffic communicated over one or more RF wireless communication networks. For example, these one or more values may be associated with bandwidth, throughput, latency, jitter, error rate, data rate, energy efficiency, quality of service, and the like.

In one or more embodiments, the BMA may provide for recommendations and/or automated remediation of one or more of wireless network communication anomalies, out of range network communication threshold values, or network communication outages over one or more portions of the wireless or wired communication networks. For example, the BMA may automatically recommend actions to remediate a network communication outage by pre-determining or determining in real time alternative network traffic routes that are presented to the user. Also, the BMA may be arranged to automatically remediate the outage by rerouting network traffic over one or more of the alternative network traffic routes for at least that portion of a wireless communication network that is experiencing an outage. Further, the recommendations and/or automated remediation may be provided for different types of wireless network topologies employed by the wireless communication networks, including one or more of mesh, star, fully connected, bus, tree, ring, or line.

In one or more embodiments, the BMA provides for employing machine learning to generate one or more models of network traffic on the one or more wireless networks and one or more other models for the operation of at least a portion of the RF signal repeater devices available on the wireless networks. Further, the one or more network traffic models and the one or more RF signal repeater device operation models may be employed to provide predictive and/or real time recommended actions and/or automated remediation actions to KPI anomalies and network outages. Additionally, one or more of the network models or the operation models may be iteratively revised dynamically and/or in real time based on one or more of modifications, maintenance, KPI anomalies, updates, or revisions affecting one or more of the network traffic, RF signal repeater devices, or one or more portions of the wireless networks. Further, in one or more embodiments, anomalies may be associated with one or more of a non-expected change to a configuration and/or a parameter value for a wireless device or a service, an alarm associated with the wireless networks and/or wireless devices, or execution of a remediation action to cure/self-heal one or more detected issues, such as an outage or a non-expected change.

In one or more embodiments, the BMA provides an Application Programming Interface (API), and or a user interface (UI), such as a dashboard for a desktop computing device or a mobile computing device to enable a user to monitor and control the remotely located RF signal repeater devices. The monitoring and control may include one or more of commissioning, upgrading, maintaining, analyzing, registering, and load balancing the one or more RF signal repeater devices on one or more wireless networks.

In one or more embodiments, the BMA employs a separate wireless and/or wired communication channel to monitor and control a plurality of RF signal repeater devices on one or more wireless networks. Further, the separate wireless and/or wired communication channel may employ one or more communication protocols, other than 5G protocols, that are omnidirectional and available to communicate control related commands to for the RF signal repeater devices. These other communication protocols may include one or more of Long Term Evolution (LTE), WiFi, ethernet, or the like. Also, in one or more embodiments, an IoT network may be arranged to provide at least a portion of the separate wireless and/or wired communication channel for the BMA to monitor and control a plurality of remotely located RF signal repeater devices on one or more wireless networks.

In one or more embodiments, one or more alerts and/or alarms may be provided by the BMA in the UI for display to users and/or through API commands for other applications such as an Element Management System (EMS), or the like. The one or more alarms may include selectable display and/or publication of an alert/alarm message for one or more types of alarm/alert conditions requiring immediate or future attention of the user. The alarm/alert conditions may include one or more of: (1) a temperature value for an RF signal repeater device that is outside a threshold or range of operational or ambient temperatures; (2) no response by an RF signal repeater device to a watchdog timer and/or a heartbeat signal provided by an IoT hub; and (3) customer premises equipment (CPE) or UE that is unable to connect to a wireless base station because their connection to the wireless base station through one or more RF signal repeater devices is lost.

In one or more embodiments, the BMA may automatically detect one or more different anomalies in key performance indicators (KPIs). Also, the BMA may also be arranged to automatically apply one or more remediation actions to compensate for the one or more detected anomalies. Also, in one or more embodiments, the BMA may be arranged to automatically detect and remediate/cure unintended configuration changes such as firmware updates, or obsolete configuration settings regarding the control, operation or monitoring of the RF signal repeater devices.

In one or more embodiments, the BMA can automatically trigger "heatmap audits" such as raster scan searches for improved wireless communication with one or more wireless base stations or other RF signal repeater devices by at least a portion of the RF signal repeater devices affected by a maintenance procedure either prior to or during maintenance procedures. These automatic raster scan searches are employed to identify one or more available "donor" RF signal repeater devices or wireless base stations in the wireless network that are not subject to the maintenance procedure and have a largest overall capacity and capability to replace each RF signal repeater device that may be subject to the maintenance procedures. Further, the BMA may be arranged to automatically switch over network traffic to the one or more donor RF signal repeater devices during or prior to maintenance procedures.

In one or more embodiments, the BMA may employ one or more RF signal repeater devices to "sniff" out and decode protocols for the network traffic associated with one or more different wireless carriers and identify corresponding UEs and RF signal repeater devices that correspond to the different wireless carriers. Also, the BMA may employ one or more RF signal repeater devices to identify "white zones" where no wireless communication is unavailable for UEs to communicate with wireless base stations by routes provided by the RF signal repeater devices over a wireless network.

Also, in one or more embodiments, the BMA may be provided as a locally hosted application, a cloud application, or a hybrid cloud application in communication with an EMS for one or more wireless networks.

Illustrated Operating Environment

FIG. 1A illustrates one embodiment of a holographic metasurface antenna (HMA) which takes the form of a surface scattering antenna 100 that includes multiple scattering elements 102a, 102b that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102a, 102b may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102a, 102b are adjustable scattering elements having electromagnetic properties that are adjustable in response to one or more external inputs. Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1A, scattering elements that have been adjusted to a first state having first electromagnetic properties are depicted as the first elements 102a, while scattering elements that have been adjusted to a second state having second electromagnetic properties are depicted as the second elements 102b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1A, the scattering elements 102a, 102b have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102a, 102b are responsive to the reference wave 105 to produce a plurality of scattered electromagnetic waves having amplitudes that are functions of (e.g., are proportional to) the respective first and second couplings. A superposition of the scattered electromagnetic waves comprises an electromagnetic wave that is depicted, in this example, as an object wave 110 that radiates from the surface scattering antenna 100.

FIG. 1A illustrates a one-dimensional array of scattering elements 102a, 102b. It will be understood that two- or three-dimensional arrays can also be used. In addition, these arrays can have different shapes. Moreover, the array illustrated in FIG. 1A is a regular array of scattering elements 102a, 102b with equidistant spacing between adjacent scattering elements, but it will be understood that other arrays may be irregular or may have different or variable spacing between adjacent scattering elements. Also, Application Specific Integrated Circuit (ASIC)109 is employed to control the operation of the row of scattering elements 102a and 102b. Further, controller 110 may be employed to control the operation of one or more ASICs that control one or more rows in the array.

Figure 1B:
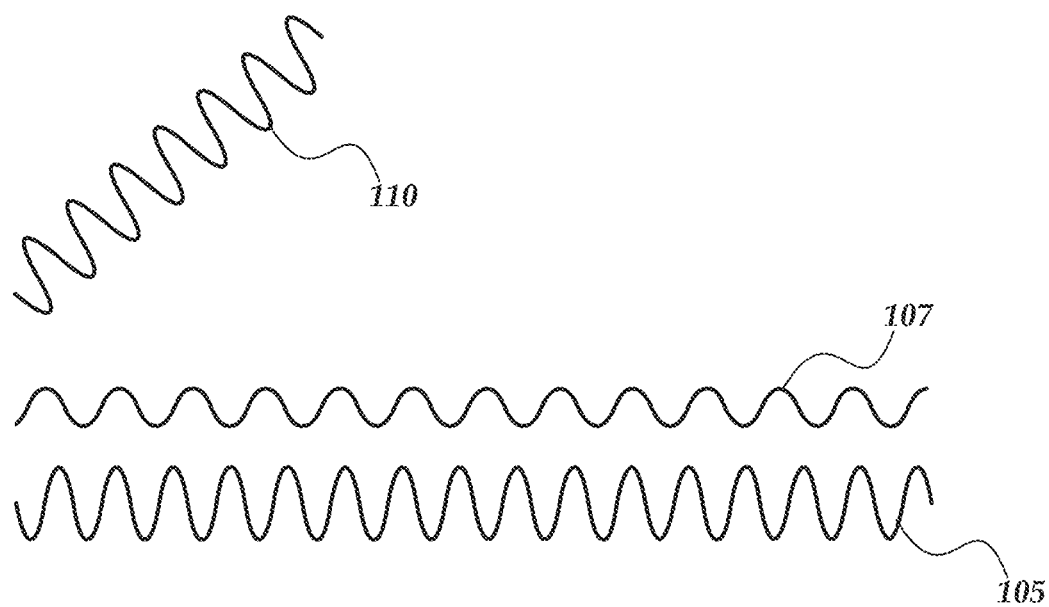
FIG. 1B shows a representation of one embodiment of a synthetic array illustrating a reference waveform and a hologram waveform (modulation function) that in combination provide an object waveform of electromagnetic waves.
Figure 1C:
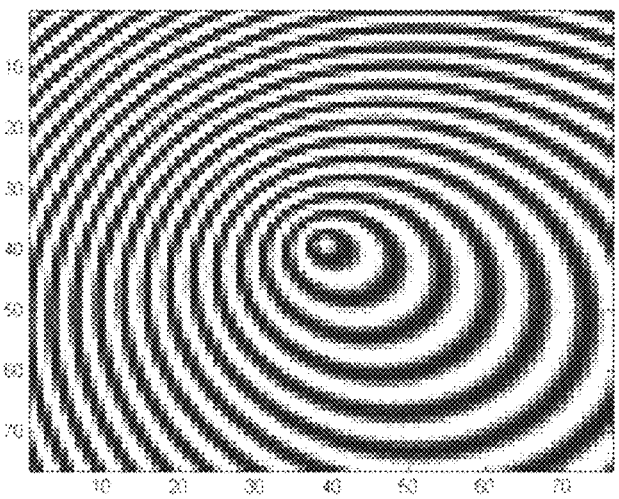
FIG. 1C shows an embodiment of an exemplary modulation function for an exemplary surface scattering antenna.
Figure 1D:
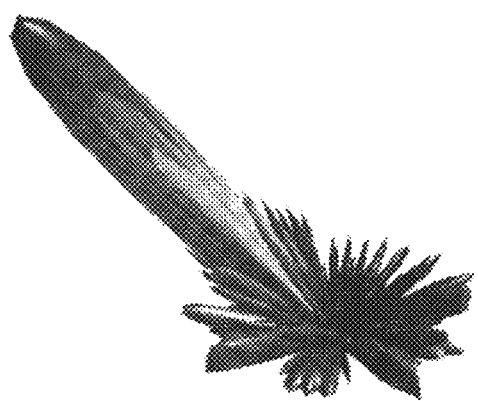
FIG. 1D shows an embodiment of an exemplary beam of electromagnetic waves generated by the modulation function of FIG. 1C.

The array of scattering elements 102a, 102b can be used to produce a far-field beam pattern that at least approximates a desired beam pattern by applying a modulation pattern 107 (e.g., a hologram function, H) to the scattering elements receiving the reference wave ($\psi_{ref}$) 105 from a reference wave source, as illustrated in FIG. 1B. Although the modulation pattern or hologram function 107 in FIG. 1B is illustrated as sinusoidal, it will be recognized non-sinusoidal functions (including non-repeating or irregular functions) may also be used. FIG. 1C illustrates one example of a modulation pattern and FIG. 1D illustrates one example of a beam generated using that modulation pattern.

In at least some embodiments, a computing system can calculate, select (for example, from a look-up table or database of modulation patterns) or otherwise determine the modulation pattern to apply to the scattering elements 102a, 102b receiving the RF energy that will result in an approximation of desired beam pattern. In at least some embodiments, a field description of a desired far-field beam pattern is provided and, using a transfer function of free space or any other suitable function, an object wave ($\psi_{obj}$) 110 at an antenna's aperture plane can be determined that results in the desired far-field beam pattern being radiated. The modulation function (e.g., hologram function) can be determined which will scatter the reference wave 105 into the object wave 110. The modulation function (e.g., hologram function) is applied to scattering elements 102a, 102b, which are excited by the reference wave 105, to form an approximation of an object wave 110 which in turn radiates from the aperture plane to at least approximately produce the desired far-field beam pattern.

In at least some embodiments, the hologram function H (i.e., the modulation function) is equal the complex conjugate of the reference wave and the object wave, i.e., $\psi_{ref}^{*}\psi_{obj}$. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively, or additionally, embodiments of the surface scattering antenna may be adjusted to provide a selected near field radiation profile, e.g. to provide near-field focusing or near-field nulls.

The surface scattering antenna can be considered a holographic beamformer which, at least in some embodiments, is dynamically adjustable to produce a far-field radiation pattern or beam. In some embodiments, the surface scattering antenna includes a substantially one-dimensional wave-propagating structure 104 having a substantially one-dimensional arrangement of scattering elements. In other embodiments, the surface scattering antenna includes a substantially two-dimensional wave-propagating structure 104 having a substantially two-dimensional arrangement of scattering elements. In at least some embodiments, the array of scattering elements 102a, 102b can be used to generate a narrow, directional far-field beam pattern, as illustrated, for example, in FIG. 1C. It will be understood that beams with other shapes can also be generated using the array of scattering elements 102a, 102b.

In at least some of the embodiments, the narrow far-field beam pattern can be generated using a holographic metasurface antenna (HMA) and may have a width that is 5 to 20 degrees in extent. The width of the beam pattern can be determined as the broadest extent of the beam or can be defined at a particular region of the beam, such as the width at 3 dB attenuation. Any other suitable method or definition for determining width can be used.

A wider beam pattern (also referred to as a "radiation pattern") is desirable in a number of applications, but the achievable width may be limited by, or otherwise not available using, a single HMA. Multiple instances of HMAs can be positioned in an array of HMAs to produce a wider composite far-field beam pattern. It will be recognized, however, that the individual beam patterns from the individual HMAs will often interact and change the composite far-field beam pattern so that, at least in some instances, without employing the one or more embodiments of the invention, the simple combination of the outputs of multiple instances of HMAs produces a composite far-field beam pattern that does not achieve the desired or intended configuration.

Figure 1E:
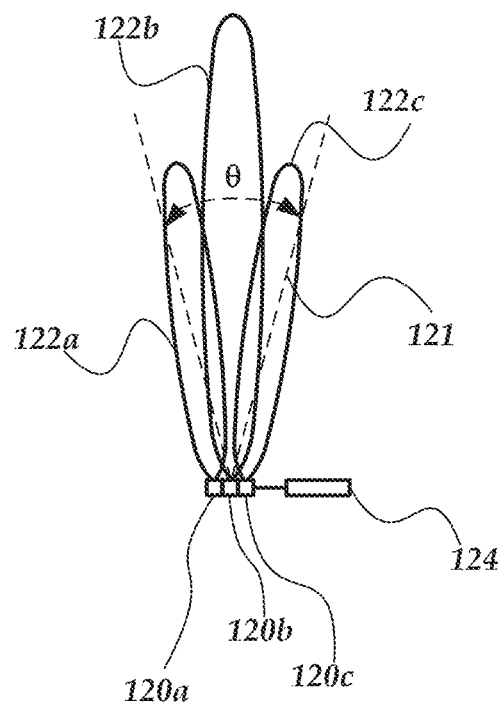
FIG. 1E shows a side view of another embodiment of an exemplary arrangement of multiple instances of HMAs.
Figure 1F:
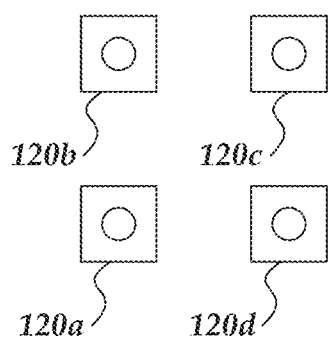
FIG. 1F shows a top view of yet another embodiment of an exemplary arrangement of multiple instances of HMAs.

FIG. 1E illustrates an arrangement of HMAs 120a, 120b, 120c that produce beams 122a, 122b, 122c where the middle beam 122b is substantially different in size and shape from the other two beams 122a, 122c. FIG. 1F illustrates, in a top view, yet another arrangement of HMAs 120a, 120b, 120c, 120d which form a two-dimensional array.

Also, one or more particular shapes of beam patterns, such as wide beam patterns, narrow beam patterns or composite beam patterns, may be desirable in a number of applications at different times for different conditions, but may not be practical or even available using a single HMA. In one or more embodiments, multiple instances of HMAs may be positioned in an array to produce a wide variety of composite, near-field, and/or far-field beam patterns without significant cancellation or signal loss. Since the object waves of multiple instances of HMAs may interfere with each other, adjustment to their object waves may be desirable to generate a beam pattern "closer" to the desired shape of a particular beam pattern. Any suitable methodology or metric can be used to determine the "closeness" of a beam pattern to a desired beam pattern including, but not limited to, an average deviation (or total deviation or sum of the magnitudes of deviation) over the entire beam pattern or a defined portion of the beam pattern from the desired beam pattern or the like.

In one of more embodiments, a physical arrangement of HMAs may be existing or can be constructed and coupled to a reference wave source. In one or more embodiments, a hologram function can be calculated, selected, or otherwise provided or determined for each of the HMAs. Each of the HMAs includes an array of dynamically adjustable scattering elements that have an adjustable electromagnetic response to a reference wave from the reference wave source. The hologram function for the HMA defines adjustments of the electromagnetic responses for the scattering elements of the HMA to produce an object wave that is emitted from the HMA in response to the reference wave. The object waves produced by the HMAs may be combined to produce a composite beam. Any suitable method or technique can be used to determine or provide any arrangement of HMAs to produce a composite beam, such as the exemplary composite beams illustrated in FIGS. 1E and 1F.

Figure 2A:
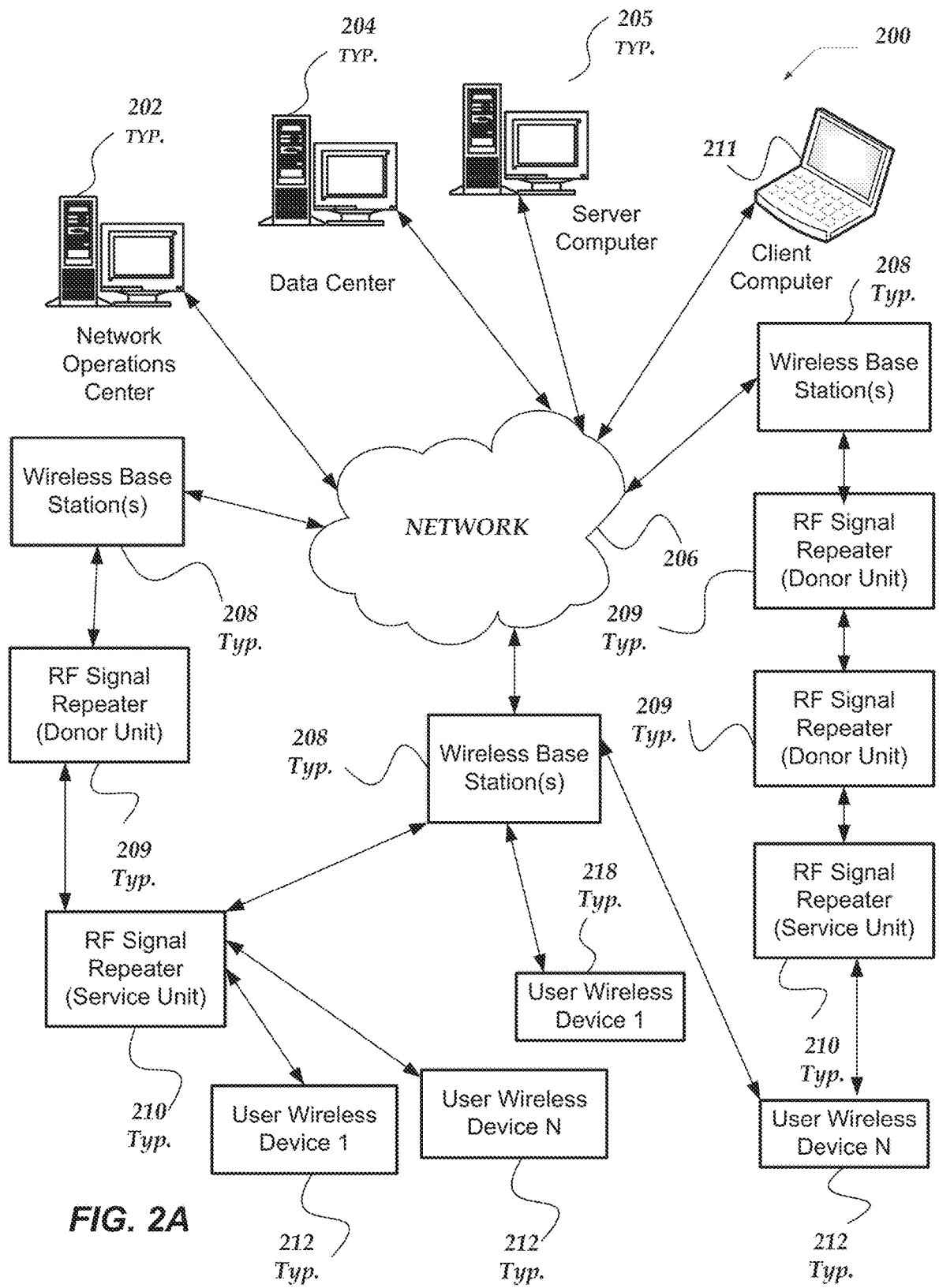
FIG. 2A shows a top view of an embodiment of an exemplary environment, including an arrangement of a network operations center, data center, server computer, wireless base stations, RF signal repeater devices, and multiple instances of wireless user equipment, in which various embodiments of the invention may be implemented.

As shown in FIG. 2A, an overview of system 200 is illustrated for communicating data from one or more data centers 204 which employs one or more network operations centers 202 to route the data to one or more remote wireless base stations 208 that communicate the data in the form of RF wireless signals to one or more user wireless devices (UEs) 212. As shown, the data is communicated from one or more data centers 204 and routed in part by one or more NOCs 202 and the BMA at server computer 205 over network 206 to a plurality of remote wireless base stations 208 that wirelessly communicate the data directly with one or more UEs 212s, or a plurality of remote RF signal repeater devices that can be configured as donor unit device 208 to relay the wireless signals along its route or configured as a service unit device that wireless communicates with the UEs 212. The RF signal repeater devices provide for multiplexing communication with each other and/or the UEs 212 to improve throughput. Also, one or more user wireless devices (UEs) 212 are shown in direct communication with an RF signal repeater device configured as service unit 210 and also in direct communication one or more wireless base stations 208. Also, server computer 205 may optionally include an EMS platform/application that is integrated with the BMA and provides management of the various elements in the wireless network, including all of the RF signal repeater devices and the wireless base station. Additionally, client computer 211 may be provided for one or more authenticated users to access a user interface or API commands for the BMA and/or the EMS.

Although not shown, an RF signal repeater device may be a separate device that employs an interface to directly communicate wireless signals with wireless base station 208 through a physical connection, such as a coaxial fiber cable, waveguide, or other type of cable capable of communicating at least uplink and downlink wireless signals.

In one or more embodiments, network 206 may be configured with an IoT architecture to couple network operation center computers, data center computers, and server computers with the various types of elements that form the wireless network which may include the wireless base stations.

Also, in one or more embodiments, network 206 may include various wired and/or wireless technologies for communicating with a remote device, such as, but not limited to, USB cable, Bluetooth®, Wi-Fi®, or the like. In some embodiments, network 206 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 206 may be enabled to employ various forms of communication technology, topology, computer-readable media, or the like, for communicating information from one electronic device to another. For example, network 206 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures than IoT and/or protocols—to enable information to be transferred from one network to another. In other embodiments, remote computers and/or other related electronic devices could be connected to a network via a modem and temporary telephone link. In essence, network 206 may include various communication technologies by which information may travel between computing devices.

Network 206 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer. Such sub-networks may include mesh networks, Wireless LAN (WLAN) networks, cellular networks, or the like. In one or more of the various embodiments, the system may include more than one wireless network.

Network 206 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

In various embodiments, at least a portion of network 206 may be arranged as an autonomous system of elements such as nodes, links, paths, terminals, gateways, routers, switches, firewalls, load balancers, forwarders, repeaters, optical-electrical converters, base stations, or the like, which may be connected by various communication links. These autonomous systems may be configured to self-organize based on an IoT architecture and current operating conditions and/or rule-based policies, such that the network topology of the network may be modified.

Figure 2B:
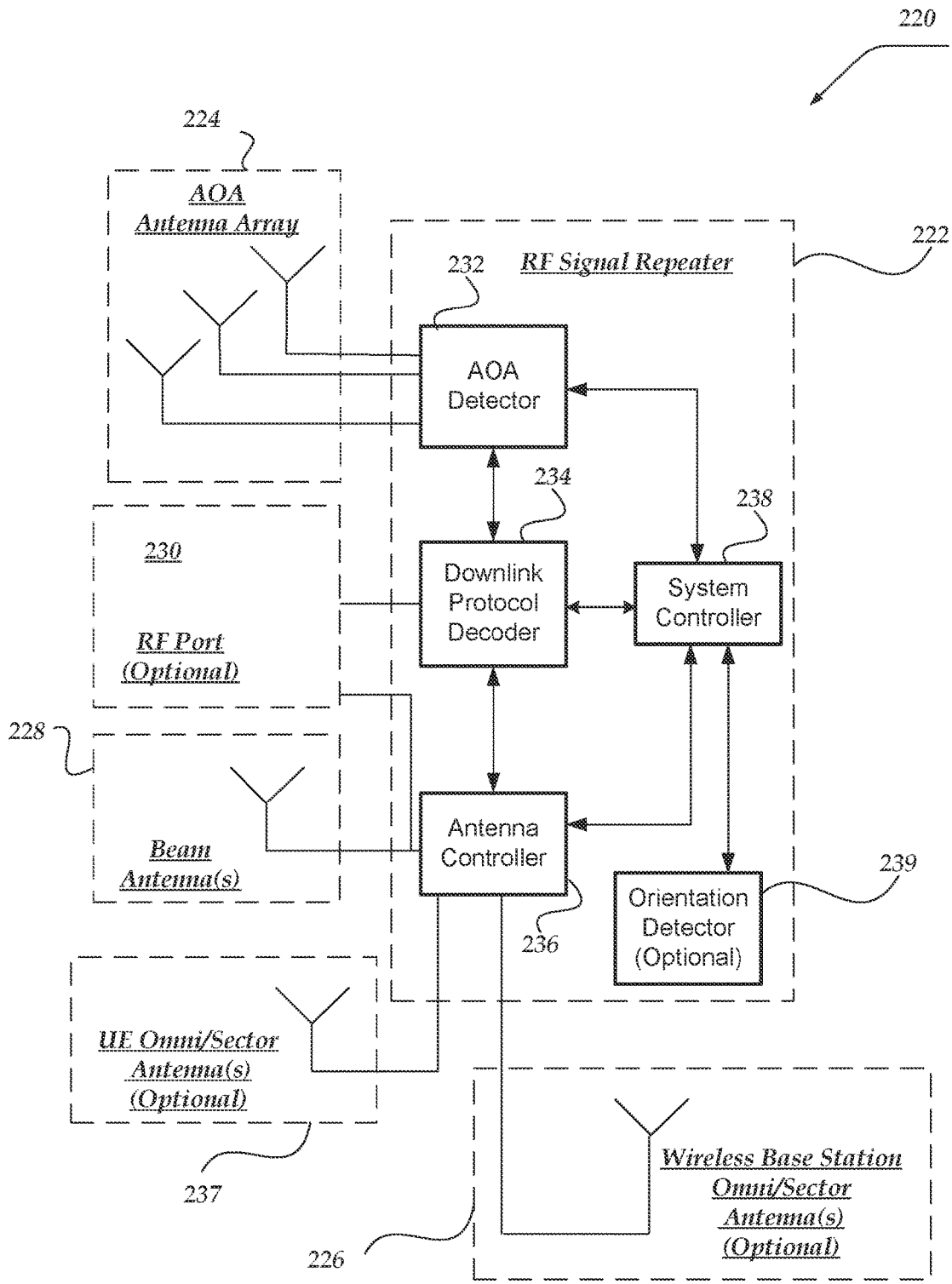
FIG. 2B shows an exemplary embodiment of a RF signal repeater device that is remotely located from a wireless base station.

FIG. 2B illustrates an exemplary schematic overview 220 of RF signal repeater device 222, which is coupled to Angle of Arrival (AoA) antenna array component 224, one or more optional wireless base station omnidirectional/sector directional antenna components 226, one or more optional UE omnidirectional/sector directional antenna components 237, one or more beam antenna components 228 that may be used to communicate with one or more UEs, wireless base stations, or other RF signal repeater devices, and one or more optional radio frequency RF inputs (not shown) connected to one or more optional radio frequency (RF) downlink ports 230. In one or more embodiments, a physical connection between the one or more RF inputs and the one or more downlink RF ports 230 is provided by one of a coaxial fiber cable, a waveguide, or another conductive component that is arranged to communicate downlink RF signals between RF signal repeater device 222 and one or more wireless base stations.

In one or more embodiments, RF signal repeater device 222 may be arranged to operate as a donor unit device that relays RF signals with the beam antennas between one or more wireless base stations, or other RF signal repeaters that are arranged to operate as other donor unit devices or a service unit device. Additionally, the RF signal repeater device may be arranged to operate as a service unit device that communicates the RF signals to one or more UEs that are provided by one or more wireless base stations or other RF signal repeater devices that are arranged to operate donor unit devices.

RF signal repeater device 222 includes system controller 238 which manages the operation of several components, including AoA detector component 232, downlink protocol decoder component 234, antenna controller 236, and optional orientation detector component 239. AoA detector component 232 is coupled to AoA array antennas component 224.

As shown, AoA detector component 232 is arranged to employ AoA antenna array 224 to determine an azimuth and an elevation that best fits uplink wireless RF signals communicated to a wireless base station by remotely located UEs. Also, AoA detector component 232 may use a schedule provided by downlink protocol decoder component 234 to sort, in time and frequency, digitized data corresponding to the wave forms of each of the received uplink wireless RF signals so that the data received from each UE can be processed independently and separately identify each UE that is communicating with the wireless base station at a scheduled time. AoA detector component 232 provides a table of identifiers for each UE along with their azimuths and elevations relative to AoA antenna array 234, which is associated with the schedule provided by the downlink protocol decoder component.

As shown, downlink protocol decoder component 234 employs downlink RF signals communicated by the wireless base station through one or more RF inputs that are connected to one or more wireless base station RF downlink ports 230 to determine the schedule employed by the wireless base station to communicate with a plurality of identified UEs. Downlink protocol decoder component 234 monitors the downlink RF signals for control information by decoding its corresponding one or more wireless communication protocols, which in some circumstances may include a 4G protocol such as Long Term Evolution (LTE).

Additionally, an exemplary decoding process employed by downlink protocol decoder component 234 for the LTE protocol includes at least in part as follows: (1) synching to the primary and secondary synchronization signals to determine a cellular ID and time for synching for each UE; (2) decode a Management Information Database (MIB) to determine the bandwidth of the wireless base station's communication with the UE; (3) extract Physical Control Format Indicator Channel (PCFICH) to determine control region numerology that is used in the Physical Downlink Control Channel (PDCCH); (4) blind decode each possible PDCCH to identify the scheduling information; and (5) employ the physical download shared channel (PDSCH) information to decode a system information block that is used to determine the uplink bandwidth. The result of the decoding process for the LTE protocol is determining a schedule that identifies a time and a frequency allocation for each UE for transmitting and receiving wireless RF signals with the wireless base station. In this way, downlink protocol decoder component 234 is able to provide the determined schedule to AoA detector component 232 and antenna controller component 236. Additionally, a similar decoding process, albeit different in some ways, may be employed to decode other wireless communication protocols, such as other 4G protocols and/or 5G protocols.

As shown, downlink protocol decoder component 234 employs an RF input (not shown) connected to wireless base station RF downlink port 230 to monitor downlink RF signals for control information broadcast by the wireless base station. In one or more embodiments, the control information is not encrypted or encoded. Further, in one or more embodiments, downlink protocol decoder component 234 does not decrypt or read user data communicated between the wireless base station and one or more UEs. Further, in one or more embodiments, a wireless service provider or carrier that controls the wireless base station may not know a location of each identified UE that is in communication with the wireless base station. Also, the control information may include a schedule for the wireless base station that allocates a time period when each identified UE is enabled for communication of wireless signals (uplink and downlink) with the wireless base station.

Furthermore, downlink protocol decoder component 234 may provide additional information regarding one or more of the identified UEs in communication with the wireless base station to the carrier which controls the wireless base station or another carrier for different purposes, including emergency services, security services, advertising or marketing. The provided information may include one or more of azimuth, elevation, carrier, or a determined location of one or more identified UEs, or a strength of wireless signals communicated between the UE and one or more beam antennas operated by antenna controller component 236.

In one or more embodiments, antenna controller component 236 generates a pointing schedule based on a combination of the allocation schedule provided by downlink protocol decoder component 234 and the table provided by AoA detector component 232. The pointing schedule includes the azimuth, elevation, and time schedule for transmitting and receiving wireless signals with each UE identified to be in communication with the wireless base station. In one or more embodiments, the pointing schedule may also include a strength of uplink wireless signals communicated by identified UEs, and one or more waveforms employed by a beam forming antenna to radiate a beam of wireless signals in the direction of each identified UE.

Also, in one or more embodiments, antenna controller component 236 may employ the one or more waveforms to configure the one or more beam forming antennas 228 to generate a beam of wireless downlink RF signals broadcast by the wireless base station at a scheduled time in the direction defined by the azimuth and elevation corresponding to each identified UE listed in the pointing schedule. Additionally, in one or more embodiments, antenna controller component 236 may provide a gain for the beam of wireless downlink RF signals radiated in the direction of an identified UE based on a strength of uplink wireless RF signals from identified UEs that are monitored by AoA detector component 232 with AoA antenna array 224.

Additionally, in one or more embodiments, the antenna controller component 236 may receive downlink wireless RF signals communicated by the wireless base station for each identified UE on the schedule with one or more of the optional omnidirectional/sector directional wireless base station antennas 226. In this way, RF signal repeater device 222 may employ wireless base station antennas 226 to receive the downlink RF signals wirelessly transmitted by one or more types of antennas (not shown) employed by the wireless base station (not shown). Further, the received downlink RF signals may be retransmitted as a beam waveform that is radiated in the direction of each identified UE at the corresponding time periods allocated in the pointing schedule. Also, the antenna controller 236 can receive downlink RF signals communicated in 5G or 4G protocols from the wireless base station, and then multiplex the retransmission of the received downlink RF signals to each identified UE. Additionally, in one or more embodiments, the one or more beam antenna 228 may include one or more a holographic beam forming (HBF) antenna, a parabolic antenna, a spherical antenna, a helical antenna, a yagi antenna, a horn antenna, a phased array antenna, or the like.

As shown, optional orientation detector component 239 may be employed to identify a physical position of the RF signal repeater device 222 generally, and more specifically the orientation and physical position of the one or more beam antennas 228. Although not shown, orientation detector component 239 may include one or more of an accelerometer, gyroscope, compass, altimeter, or a global positioning system (GPS) component.

Additionally, as shown, system controller component 238 is in communication with AoA detector component 232, downlink protocol decoder component 234, antenna controller component 236, and optional orientation detector component 239. System controller component 238 is employed to manage and coordinate the operation of the other components. Also, in one or more embodiments, system controller component 238 is employed to communicate with one or more client computers (not shown) that are employed to remotely manage the operation of RF signal repeater device 222.

Also, the system controller component 238 may provide information regarding one or more of the identified UEs or non-identified UEs to one or more of carriers, organizations, or other entities, for different uses, e.g., emergency services, security services, advertising or marketing. The provided information may include one or more of azimuth, elevation, carrier associated with a UE, or strength of wireless RF signals communicated between the UE and the antenna controller component. Also, the provided information may include a determined location of a UE.

Additionally, in one or more embodiments (not shown in the figures), system controller component 238 may include one or more processor devices, or embedded logic hardware devices, such as, an Application Specific Integrated Circuits (ASICs), Field Programmable Gate Arrays (FPGAs), Programmable Array Logics (PALs), or the like, or combination thereof. The one or more processor devices or embedded logic hardware devices may directly execute one or more of embedded logic or logic stored in a memory to perform actions to manage the operation of other components. Also, in one or more embodiments (not shown in the figures), system controller component 238 may include one or more hardware microcontrollers instead of processor devices. In one or more embodiments, the one or more microcontrollers may directly execute their own embedded logic or logic stored in memory to perform actions and access their own internal memory and their own external Input and Output Interfaces (e.g., hardware pins and/or wireless transceivers) to perform actions, such as System On a Chip (SOC), or the like.

Additionally, in one or more embodiments, antenna controller component 236 may employ two or more waveforms to configure UE beam forming antenna component 228 to generate two or more separate beams at the scheduled time in different directions defined by two or more azimuth and elevation coordinate pairs that correspond to two or more identified UE listed in the pointing schedule and allocated a time period to communicate with the wireless base station.

Further, in one or more embodiments, antenna controller component 236 may employ two or more waveforms to configure two or more separate UE beam forming antennas 228 to generate two or more separate beams at the scheduled time in different directions defined by two or more azimuth and elevation coordinate pairs that correspond to two or more identified UE listed in the pointing schedule and allocated a time period to communicate with the wireless base station.

Moreover, in one or more embodiments, antenna controller component 236 may facilitate an arrangement of a two to one Multiple Inputs Multiple Outputs (MIMO) antenna by using both UE beam forming antenna 228 and optional UE omnidirectional/sector directional antenna 237 to provide communication with an identified UE during allocated time periods in the pointing schedule. In one or more embodiments, antenna controller component 236 may employ these two antennas to determine which antenna is able to provide the optimal, e.g., best bandwidth with the lowest latency to communicate downlink RF signals to an identified UE. Once the optimal determination is made for the identified UE, antenna controller component 236 may use the determined antenna for further communication of downlink RF signals with the UE.

Further, in one or more embodiments, antenna controller component 236 may employ both UE beam forming antenna 228 and optional omnidirectional/sector directional antenna 237 to simultaneously provide communication of wireless downlink RF signals to at least two different identified UEs that are simultaneously allocated time periods in the pointing schedule for communication with the wireless base station. Also, antenna controller component 236 may be arranged to employ one or more policies to determined which of these two antennas provides simultaneous communication with each of the at least two UEs. For example, a policy may prioritize communication by UE beam forming antenna 228 with a preselected UE, or the first UE to respond to wireless control signals, when simultaneous communication with two or more UEs occurs. Based on the policy, one UE may communicate via UE beam forming antenna 228 and the other UE would communicate via optional UE omnidirectional/sector directional antenna 237. Also, in one or more embodiments, antenna controller component 236 may provide one or more waveforms to the beam forming antenna to cause radiation of wireless downlink RF signals omnidirectionally instead of in a shaped beam for one or more identified UEs during an allocated time period on the pointing schedule.

Illustrative Server Computer

Figure 3:
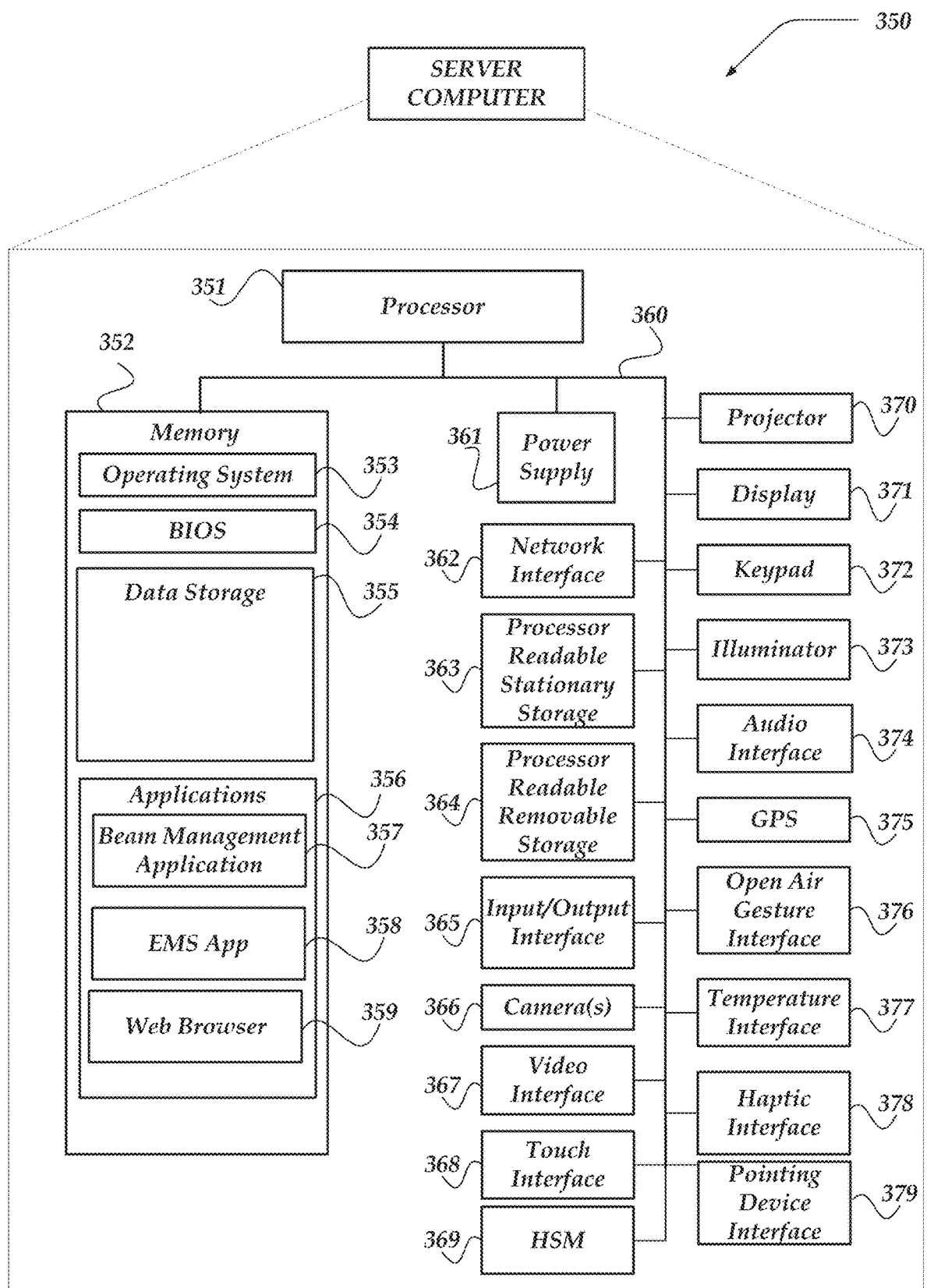
FIG. 3 shows an embodiment of an exemplary server computer device that may be included in a system such as that shown in FIG. 2A.

FIG. 3 shows one embodiment of server computer 350 that may include many more, or less, components than those shown. Server computer 350 may represent, for example, at least one embodiment of server computers shown in FIG. 2.

Server computer 350 may include processor 351 in communication with memory 352 via bus 360. Server computer 350 may also include power supply 361, network interface 362, audio interface 374, display 371, keypad 372, illuminator 373, video interface 367, input/output interface 365, haptic interface 378, global positioning systems (GPS) receiver 375, open air gesture interface 376, temperature interface 377, camera(s) 367, projector 370, pointing device interface 379, processor-readable stationary storage device 363, and processor-readable removable storage device 364. Server computer 350 may optionally communicate with a wireless base station (not shown), an Aimable Beam Antenna System (not shown) or directly with another computer. Power supply 361 may provide power to server computer 350. A rechargeable or non-rechargeable battery may be used to provide power. The power may also be provided by an external power source, such as an AC adapter or a powered docking cradle that supplements or recharges the battery.

Network interface 362 includes circuitry for coupling server computer 350 to one or more networks, and it is constructed for use with one or more wired and/or wireless communication protocols and technologies. Examples of various generations (e.g., third (3G), fourth (4G), or fifth (5G)) of communication protocols and/or technologies may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

Audio interface 374 may be arranged to produce and receive audio signals such as the sound of a human voice. For example, audio interface 374 may be coupled to a speaker and microphone (not shown) to enable telecommunication with others or generate an audio acknowledgement for some action. A microphone in audio interface 374 can also be used for input to or control of server computer 350, e.g., using voice recognition, detecting touch based on sound, and the like.

Display 371 may be a liquid crystal display (LCD), gas plasma, electronic ink, light emitting diode (LED), Organic LED (OLED) or any other type of light reflective or light transmissive display that can be used with a computer. Display 371 may also include a touch interface 368 arranged to receive input from an object such as a stylus or a digit from a human hand, and may use resistive, capacitive, surface acoustic wave (SAW), infrared, radar, or other technologies to sense touch or gestures.

Projector 370 may be a remote handheld projector or an integrated projector that is capable of projecting an image on a remote wall or any other reflective object such as a remote screen.

Video interface 367 may be arranged to capture video images, such as a still photo, a video segment, an infrared video, or the like. For example, video interface 367 may be coupled to a digital video camera, a web-camera, or the like. Video interface 367 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 372 may comprise any input device arranged to receive input from a user. For example, keypad 372 may include a push button numeric dial, or a keyboard. Keypad 372 may also include command buttons that are associated with selecting and sending images.

Illuminator 373 may provide a status indication or provide light. Illuminator 373 may remain active for specific periods of time or in response to event messages. For example, when illuminator 373 is active, it may backlight the buttons on keypad 372 and stay on while the server computer is powered. Also, illuminator 373 may backlight these buttons in various patterns when particular actions are performed, such as dialing another server computer. Illuminator 373 may also enable light sources positioned within a transparent or translucent case of the server computer to illuminate in response to actions.

Further, server computer 350 may also comprise hardware security module (HSM) 369 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 369 may be a stand-alone computer, in other cases, HSM 369 may be arranged as a hardware card that may be added to a server computer.

Server computer 350 may also comprise input/output interface 365 for communicating with external peripheral devices or other computers such as other server computers and network computers. The peripheral devices may include an audio headset, virtual reality headsets, display screen glasses, remote speaker system, remote speaker and microphone system, and the like. Input/output interface 365 can utilize one or more technologies, such as Universal Serial Bus (USB), Infrared, WiFi, WiMax, Bluetooth™, and the like.

Input/output interface 365 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to server computer 350.

Haptic interface 378 may be arranged to provide tactile feedback to a user of the server computer. For example, the haptic interface 378 may be employed to vibrate server computer 350 in a particular way when another user of a computer is calling. Temperature interface 377 may be used to provide a temperature measurement input or a temperature changing output to a user of server computer 350. Open air gesture interface 376 may sense physical gestures of a user of server computer 350, for example, by using single or stereo video cameras, radar, a gyroscopic sensor inside a computer held or worn by the user, or the like. One or more cameras 366 may be used by an application to employ facial recognition methods to identify a user, track the user's physical eye movements, or take pictures (images) or videos.

GPS device 375 can determine the physical coordinates of server computer 350 on the surface of the Earth, which typically outputs a location as latitude and longitude values. GPS device 375 can also employ other geo-positioning mechanisms, including, but not limited to, triangulation, assisted GPS (AGPS), Enhanced Observed Time Difference (E-OTD), Cell Identifier (CI), Service Area Identifier (SAI) Tracking Area Identifier (TAI), Enhanced Timing Advance (ETA), Base Station Subsystem (BSS), or the like, to further determine the physical location of server computer 350 on the surface of the Earth. It is understood that GPS device 375 can employ a gyroscope to determine an orientation and/or an accelerometer to determine movement of the server computer 350. In one or more embodiment, however, server computer 350 may, through other components, provide other information that may be employed to determine a physical location of the server computer, including for example, a Media Access Control (MAC) address, IP address, and the like.

Human interface components can be peripheral devices that are physically separate from server computer 350, allowing for remote input or output to server computer 350. For example, information routed as described here through human interface components such as display 371 or keypad 372 can instead be routed through network interface 362 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a server computer with such peripheral human interface components is a wearable computer, which might include a remote pico projector along with one or more cameras that remotely communicate with a separately located server computer to sense a user's gestures toward portions of an image projected by the pico projector onto a reflected surface such as a wall or the user's hand.

Server computer 350 may include beam management app (BMA) 357 that may be configured to remotely monitor and control of a plurality of RF signal repeater devices in one or more wireless networks. BMA 357 may provide monitoring and control information to an Element Management System (EMS) regarding the plurality of RF signal repeater devices. Also, BMA 357 may authorize and enable different types of users (e.g., technicians, administrators, and the like) to use a displayed user interface (UI) or an application protocol interface (API) to quickly identify and troubleshoot technical problems, assist in remediation of anomalies in KPIs or network outages, and maintain/establish available and capable communication routes over one or more wireless networks between one or more wireless base stations and a plurality of identified UEs and CPEs. The app may also enable adjustment of particular values, parameters, and characteristics of the RF signal repeater devices to improve one or more aspects of the operation of their corresponding beam antennas. In one or more embodiments, BMA 357 may utilize an IoT network to communicate with the at least a portion of the elements in the one or more wireless networks, including the plurality of RF signal repeater devices.

Server computer 350 may include web browser application 359 that is configured to receive and to send web pages, web-based messages, graphics, text, multimedia, and the like. The server computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 352 may include RAM, ROM, or other types of memory. Memory 352 illustrates an example of computer-readable storage media (devices) for storage of information such as computer-readable instructions, data structures, program modules or other data. Memory 352 may store BIOS 354 for controlling low-level operation of server computer 350. The memory may also store operating system 353 for controlling the operation of server computer 350. It will be appreciated that this component may include a general-purpose operating system such as a version of UNIX, or LINUX™, or a specialized server computer communication operating system such as Windows Phone™, Apple iOS™ or the Symbian® operating system. The operating system may include, or interface with a Java virtual machine module that enables control of hardware components or operating system operations via Java application programs.

Memory 352 may further include one or more data storage 355, which can be utilized by server computer 350 to store, among other things, applications 356 or other data. For example, data storage 355 may also be employed to store information that describes various capabilities of server computer 350. The information may then be provided to another device or computer based on any of a variety of methods, including being sent as part of a header during a communication, sent upon request, or the like. Data storage 355 may also be employed to store social networking information including address books, buddy lists, aliases, user profile information, or the like. Data storage 355 may further include program code, data, algorithms, and the like, for use by a processor, such as processor 351 to execute and perform actions. In one embodiment, at least some of data storage 355 might also be stored on another component of server computer 350, including, but not limited to, non-transitory processor-readable removable storage device 364, processor-readable stationary storage device 363, or even external to the server computer.

Applications 356 may include computer executable instructions which, when executed by server computer 350, transmit, receive, or otherwise process instructions and data. Applications 356 may include, for example, BMA 357, EMS applications 358, web browser 359, or the like. Server computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), server computer 350 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), server computer 350 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Generalized Operations

Figure 4A:
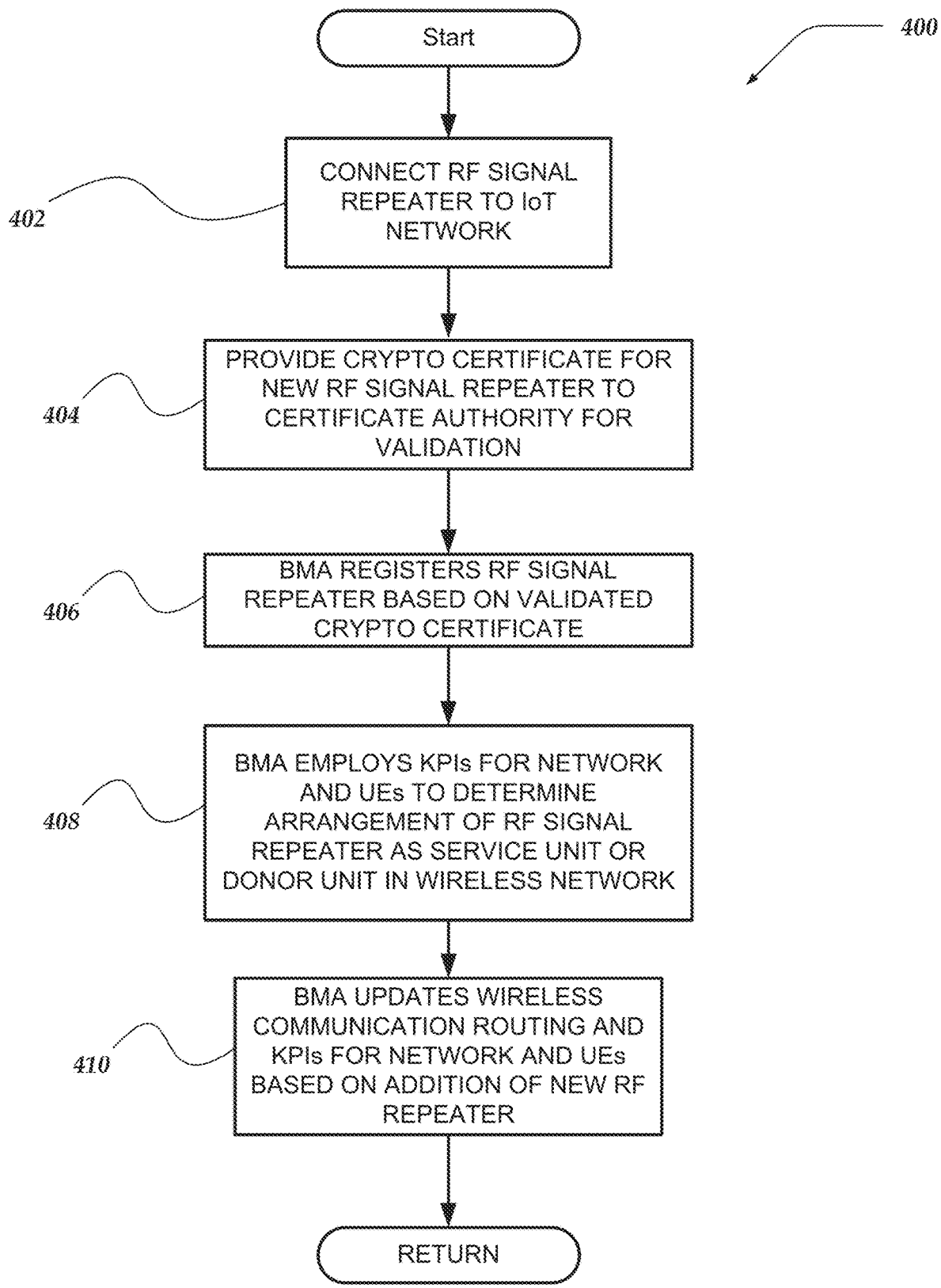
FIG. 4A illustrates an embodiment of a logical flow diagram for an exemplary method of registering a new RF signal repeater device in a wireless IoT network in accordance with key performance indicators for the network and user equipment.

FIG. 4A illustrates an embodiment of a logical flow diagram for an exemplary method 400 for registering a new RF signal repeater device in a wireless IoT network in accordance with key performance indicators for the network and user equipment. Moving from a start block, the process steps to block 402 wherein a newly commissioned RF signal repeater device is connected to an IoT wireless network. At block, 404, a cryptographic certificate for the new RF signal repeater device is provided to a separate Certificate Authority service for validation.

Next, at block 406, the beam management application employs validation of the certificate to register the new RF signal repeater device as an element of the wireless network. Stepping to block 408, the beam management application employs KPIs for the wireless network and the UEs to determine the arrangement of the RF repeater device as a service unit or donor unit in the wireless network.

At block 410, the beam management application updates wireless communication routing and KPIs for network and user equipment based on addition of newly registered RF signal repeater device on the wireless network. Further, the process moves to the return block and continues performing other actions.

Figure 4B:
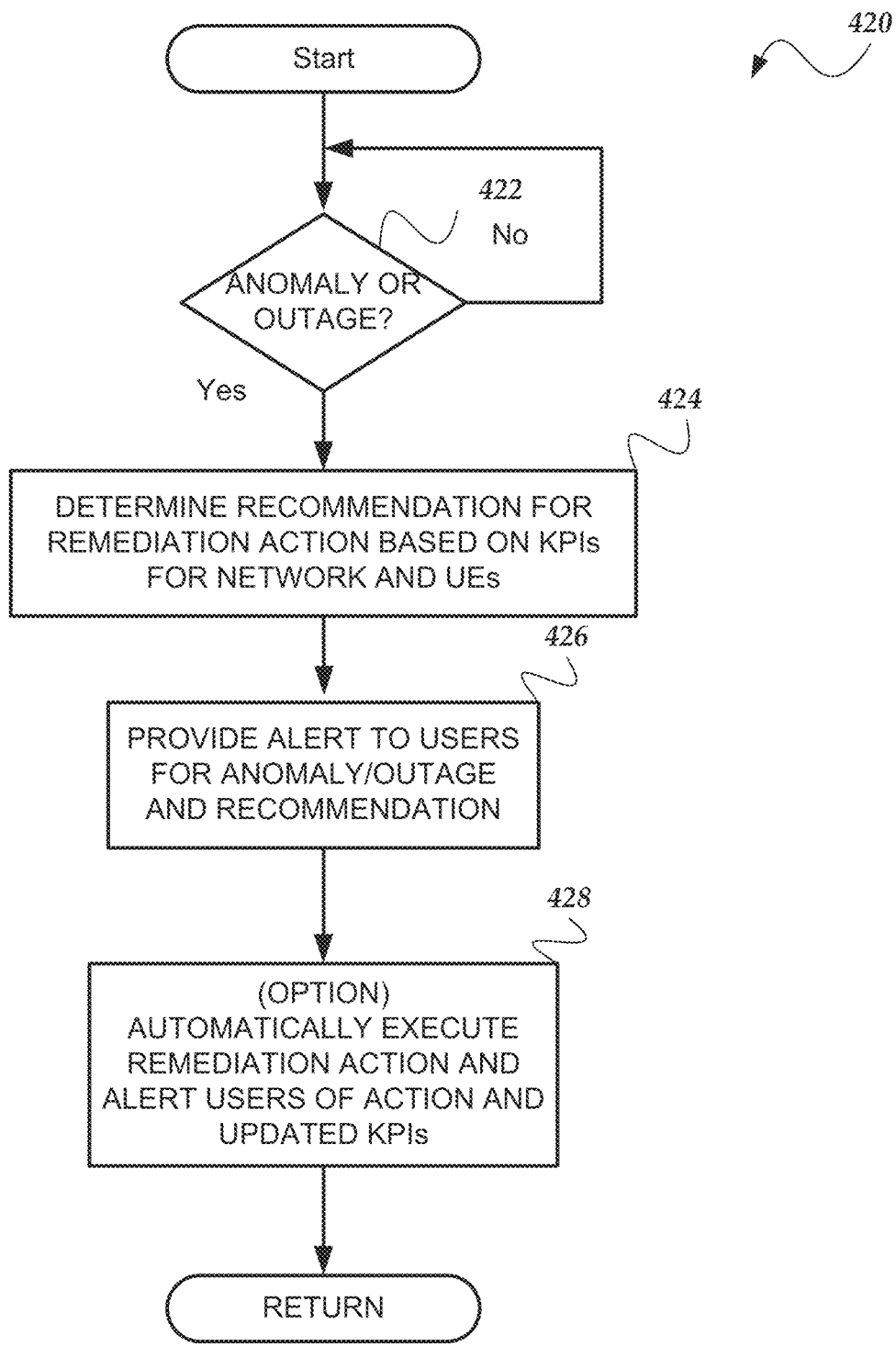
FIG. 4B shows an embodiment of a logical flow diagram for an exemplary method of detecting an anomaly or outage for a wireless IoT network and automatically remediating the anomaly or outage in accordance with key performance indicators for the network and user equipment.

FIG. 4B shows an embodiment of a logical flow diagram for an exemplary method 420 for detecting an anomaly or outage for a wireless IoT network and automatically remediating the anomaly or outage in accordance with key performance indicators for the network and user equipment. Moving from a start block to decision block 422, where the process continuously monitors as to whether an anomaly in the operation of an RF repeater device, an anomaly in a KPI, or an outage of one or more portions of a wireless network is occurring. Once the decision is affirmative, the process steps to block 424 where the process determines a recommendation for one or more remediation actions based at least in part on changes to KPIs for the wireless network and/or UEs.

At block 426, alerts are provided to users of the beam management application of detected anomalies/outages and recommendations for one or more remediation actions. Optionally, at block 428, the beam management application provides for automatic execution of the one or more recommended remediation actions. Also, users are alerted of the execution of the remediation and updates to the KPIs after the remediation actions were executed. Next, the process advances to the return block and continues performing other actions.

Figure 4C:
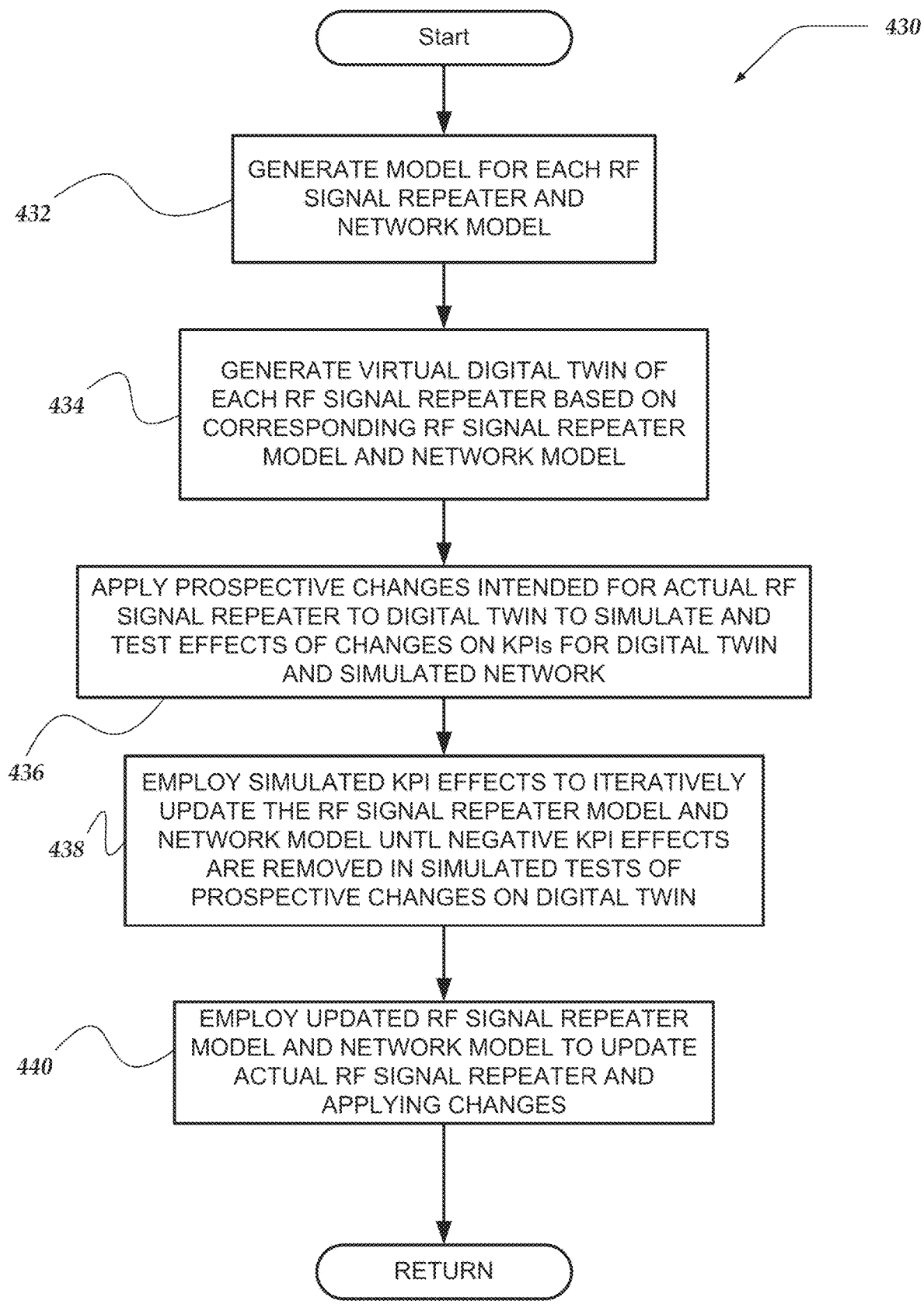
FIG. 4C illustrates an embodiment of a logical flow diagram for an exemplary method of modeling operation of each RF signal repeater device and modeling the corresponding network to virtually determine effects on key performance indicators for the network and user equipment before changes are applied to the operation of the actual RF signal repeater device in accordance with the invention.

FIG. 4C illustrates an embodiment of a logical flow diagram for an exemplary method 430 for modeling operation of each RF signal repeater device and modeling the corresponding network to virtually determine effects on key performance indicators for the network and user equipment before changes are applied to the operation of the actual RF signal repeater device.

Moving from a start block, the process steps to block 432 where machine learning may be employed to automatically generate a model for each RF signal repeater that is registered in the network. Also, machine learning may be employed to automatically generate a network model that corresponds to the arrangement of the RF signal repeater device as one of a service unit or a donor unit and node relationships to other elements in the network that would be defined by a number of degrees of association. Next, the process flows to block 434 where a virtual digital twin of each RF signal repeater is generated based on the RF signal repeater model and network model corresponding to an actual RF signal repeater registered on the wireless network.

Stepping to block 436, prospective changes intended for actual RF signal repeater are applied to the digital twin to simulate and test effects of changes to KPIs for digital twin and network simulated with the corresponding network model. Further, at block 438, the simulated KPI effects are employed to iteratively update the RF signal repeater model and network model until negative KPI effects are removed in simulated testing of the prospective changes applied to the digital twin.

Further, at block 438, the updated RF signal repeater model and updated network model are employed to update the RF signal repeater and apply the originally prospective changes. Next, the process moves to the return block and continues performing other actions.

Additionally, it will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the invention. Since many embodiments of the invention can be made without departing from the spirit and scope of the invention, the invention resides in the claims hereinafter appended.

What is claimed as new and desired to be protected by Letters Patent of the United States is:

1. A method for monitoring and controlling a plurality of RF signal repeater devices for one or more wireless networks, wherein execution of instructions by one or more processors, performs actions, comprising:

instantiating a beam management application that performs actions, including:
registering each validated RF signal repeater device as an element of the one or more wireless networks, wherein the validation is determined based on analysis of separate cryptographic certificates that correspond to each RF signal repeater device;
determining a mode for each registered RF signal repeater device, wherein the mode includes one of a donor unit device or a service unit device that is connected as the element of the one or more wireless networks;
configuring each registered RF signal repeater device based on the determined mode and one or more key performance indicators (KPIs) for the wireless network or user equipment (UEs);
in response to detection of one or more anomalies for the one or more KPIs or outages to one or more portions of the wireless network, automatically determining one or more actions to remediate the one or more anomalies or outages by changing operation of one or more RF signal repeaters, wherein the one or more detected anomalies include a non-expected change to a configuration or a parameter value, an alarm, or execution of a remediation action; and
providing one or more recommendations for the one or more remediation actions to a user, wherein an input of the user is employed to execute the one or more remediation actions.

2. The method of claim 1, further comprising:
automatically executing a portion or more of the one or more remediation actions absent the user input.

3. The method of claim 1, further comprising:
employing one or more RF signal repeater device models and one or more corresponding network models to monitor and control operation of each corresponding RF signal repeater device on the one or more wireless networks.

4. The method of claim 1, further comprising:
generating a virtual digital twin for each RF signal repeater device on the one or more wireless networks based on one or more RF signal repeater device models and corresponding network models;
simulating the one or more remediation actions with each virtual digital twin associated with each RF signal repeater device impacted by the one or more remediation actions; and
in response to a positive change to the one or more KPIs based on the simulation of the one or more remediation actions, executing the one or more remediation actions on the each RF signal repeater device impacted by the one or more remediation actions.

5. The method of claim 1, wherein the one or more wireless networks further comprise:
providing an Internet of Things (IoT) architecture for each network element on the one or more wireless networks.

6. The method of claim 1, wherein the one or more wireless networks, further comprise:
employing $5^{th}$ generation wireless communication protocols for communicating millimeter wave RF signals between RF signal repeater devices and with each UE and each gNb.

7. The method of claim 1, wherein each RF signal repeater device further comprises:
one or more of an HBF antenna, a parabolic antenna, a spherical antenna, a helical antenna, a yagi antenna, a horn antenna, or a phased array antenna.

8. A system for monitoring and controlling a plurality of RF signal repeater devices for one or more wireless networks, comprising:
a plurality of user equipment (UEs) capable of communicating on the one or more wireless networks;
an element management system for managing operation of elements on the one or more wireless networks; and
one or more server computers, including:
one or more memories that includes instructions;
one or more processors that execute the instructions to perform actions, comprising:
instantiating a beam management application that performs actions, including:
registering each validated RF signal repeater device as an element of the one or more wireless networks, wherein the validation is determined based on analysis of separate cryptographic certificates that correspond to each RF signal repeater device;
determining a mode for each registered RF signal repeater device, wherein the mode includes one of a donor unit device or a service unit device that is connected as the element of the one or more wireless networks;
configuring each registered RF signal repeater device based on the determined mode and one or more key performance indicators (KPIs) for the wireless network or UEs;
in response to detection of one or more anomalies for the one or more KPIs or outages to one or more portions of the wireless network, automatically determining one or more actions to remediate the one or more anomalies or outages by changing operation of one or more RF signal repeaters, wherein the one or more detected anomalies include a non-expected change to a configuration or a parameter value, an alarm, or execution of a remediation action; and
providing one or more recommendations for the one or more remediation actions to a user, wherein an input by the user is employed to execute the one or more remediation actions.

9. The system of claim 8, further comprising:
automatically executing a portion or more of the one or more remediation actions absent the user input.

10. The system of claim 8, further comprising:
employing one or more RF signal repeater device models and one or more corresponding network models to monitor and control operation of each corresponding RF signal repeater device on the one or more wireless networks.

11. The system of claim 8, further comprising:
generating a virtual digital twin for each RF signal repeater device on the one or more wireless networks based on one or more RF signal repeater device models and corresponding network models;
simulating the one or more remediation actions with each virtual digital twin associated with each RF signal repeater device impacted by the one or more remediation actions; and
in response to a positive change to the one or more KPIs based on the simulation of the one or more remediation actions, executing the one or more remediation actions on the each RF signal repeater device impacted by the one or more remediation actions.

12. The system of claim 8, wherein the one or more wireless networks further comprise:
providing an Internet of Things (IoT) architecture for each network element on the one or more wireless networks.

13. The system of claim 8, wherein the one or more wireless networks, further comprise:
employing $5^{th}$ generation wireless communication protocols for communicating millimeter wave RF signals between RF signal repeater devices and with each UE and each gNb.

14. The system of claim 8, wherein each RF signal repeater device further comprises:
one or more of an HBF antenna, a parabolic antenna, a spherical antenna, a helical antenna, a yagi antenna, a horn antenna, or a phased array antenna.

15. A processor readable non-transitory storage medium that includes instructions for monitoring and controlling a plurality of RF signal repeater devices for one or more wireless networks, wherein execution of the instructions by one or more processors performs actions, comprising:
instantiating a beam management application that performs actions, including:
registering each validated RF signal repeater device as an element of the one or more wireless networks, wherein the validation is determined based on analysis of separate cryptographic certificates that correspond to each RF signal repeater device;
determining a mode for each registered RF signal repeater device, wherein the mode includes one of a donor unit device or a service unit device that is connected as the element of the one or more wireless networks;

configuring each registered RF signal repeater device based on the determined mode and one or more key performance indicators (KPIs) for the wireless network or UEs;

in response to detection of one or more anomalies for the one or more KPIs or outages to one or more portions of the wireless network, automatically determining one or more actions to remediate the one or more anomalies or outages by changing operation of one or more RF signal repeaters, wherein the one or more detected anomalies include a non-expected change to a configuration or a parameter value, an alarm, or execution of a remediation action; and providing one or more recommendations for the one or more remediation actions to a user, wherein an input by the user is employed to execute the one or more remediation actions.

16. The processor readable non-transitory storage medium of claim 15, further comprising:

automatically executing a portion or more of the one or more remediation actions absent the user input.

17. The processor readable non-transitory storage medium of claim 15, further comprising:

employing one or more RF signal repeater device models and one or more corresponding network models to monitor and control operation of each corresponding RF signal repeater device on the one or more wireless networks.

18. The processor readable non-transitory storage medium of claim 15, further comprising:

generating a virtual digital twin for each RF signal repeater device on the one or more wireless networks based on one or more RF signal repeater device models and corresponding network models;

simulating the one or more remediation actions with each virtual digital twin associated with each RF signal repeater device impacted by the one or more remediation actions; and in response to a positive change to the one or more KPIs based on the simulation of the one or more remediation actions, executing the one or more remediation actions on the each RF signal repeater device impacted by the one or more remediation actions.

19. The processor readable non-transitory storage medium of claim 15, wherein the one or more wireless networks further comprise:

providing an Internet of Things (IoT) architecture for each network element on the one or more wireless networks.

20. The processor readable non-transitory storage medium of claim 15, further comprise:

employing $5^{th}$ generation wireless communication protocols for communicating millimeter wave RF signals between RF signal repeater devices and with each UE and each gNb.

* * * * *